(12) United States Patent
Northcut et al.

(10) Patent No.: US 6,423,223 B1
(45) Date of Patent: Jul. 23, 2002

(54) MULTI-ELEMENT, REVERSE OSMOSIS, LIQUID FILTER SYSTEM WITH FLUSHING AND FILTERING CIRCUITS

(76) Inventors: Donald A. Northcut; Douglas W. Northcut, both of 14041 SW. 320th St., Homestead, FL (US) 33030

( * ) Notice: Subject to any disclaimer, the term of this patent is extended or adjusted under 35 U.S.C. 154(b) by 0 days.

(21) Appl. No.: 09/788,533

(22) Filed: Feb. 21, 2001

Related U.S. Application Data

(63) Continuation-in-part of application No. 09/653,414, filed on Aug. 31, 2000.

(51) Int. Cl.⁷ .......................... B01D 27/08; B01D 27/14; B01D 35/30; B01D 61/02; B01D 65/02
(52) U.S. Cl. ............... 210/232; 210/323.2; 210/332; 210/335; 210/453; 210/502.1; 210/321.69; 210/748; 210/694; 210/652; 210/136; 210/138; 422/186.3
(58) Field of Search ................. 210/323.2, 332, 210/335, 444, 453, 455, 768, 232, 502.1, 136, 138, 321.69, 748, 694, 652; 422/186.3

(56) References Cited

U.S. PATENT DOCUMENTS

| | | |
|---|---|---|
| 30,366 A | 10/1860 | Warne |
| 136,364 A | 3/1873 | Conger |
| 3,780,869 A | 12/1973 | Krongos |
| 6,027,647 A * | 2/2000 | Northcut et al. ......... 210/323.2 |

* cited by examiner

*Primary Examiner*—Robert J. Popovics
(74) *Attorney, Agent, or Firm*—Siemens Patent Services, LC

(57) ABSTRACT

The present invention provides a multi-element filtering system assuring serial filtration of a liquid through multiple filter cartridges while enabling flushing without requiring removal of the filter cartridges. Both conventional and reverse osmosis filtration is performed, sequentially, within the system. The filter cartridges are held within a canister which is pressed against the cap and constrained against rotation with the cap. The canister is divided into chambers, and has passages in its floor arranged to enable serial transfer of liquid from one chamber to the next. Flushing employs liquid introduced under normal pressure. Passages leading to the flush liquid outlet enable flushing to proceed when the flush liquid outlet is opened. At other times, filtered liquid will pass through passages leading to the filtered liquid outlet. Liquid is circulated to assure filtration even when flushing, so that contamination of filtered liquid is precluded.

12 Claims, 5 Drawing Sheets

MULTI-ELEMENT, REVERSE OSMOSIS, LIQUID FILTER SYSTEM WITH FLUSHING AND FILTERING CIRCUITS

CROSS REFERENCE TO RELATED APPLICATIONS

This application is related to our issued U.S. Pat. No. 6,027,647, issued on Feb. 22, 2000 and is a Continuation-In-Part of our pending U.S. patent application Ser. No. 09/653,414, filed on Aug. 31, 2000.

BACKGROUND OF THE INVENTION

1. Field of the Invention

The present invention relates to water filters, and more particularly to a filter housing which accepts multiple, replaceable, reverse osmosis and carbon filter elements within a single housing. The filter elements are disposed in a serial arrangement for filtering purposes. Ultra-violet rays from a central core provide further bacterial purification of filtered water. The housing accommodates flushing without requiring removal for the filter elements.

2. Description of the Prior Art

In light of many contaminants which may become entrained in water supplied by domestic plumbing systems, it is desirable to filter the water prior to employing the same for human consumption. Many filters are commercial products featuring filter cartridges which are readily installed and serviced by residential occupants who may lack specialized skills as a plumber. These filters conventionally comprise housings which enclose one or more filtering elements. Consequently, separate replaceable filtering elements are readily available from commercial sources.

A filter seen in U.S. Pat. No. 3,780,869, issued to Zaharias Krongos on Dec. 25, 1973, has a housing formed in two threadably mating parts, which housing encloses plural replaceable filter elements. The filter of Krongos lacks the flushing circuitry, reverse osmosis filtering, serial filtration circuitry, UV irradiation, and inlet and outlet arrangement of the present invention.

U.S. Pat. No. 30,366, issued to M.W. Warne on Oct. 9, 1860, shows a vessel having plural compartments, each containing filtration material and connected in series. The device of Warne lacks the reverse osmosis filtration, UV irradiation, flushing circuitry, inlet and outlet arrangement of the present invention, readily replaceable filter cartridges capable of holding their form without supporting, surrounding walls, and adjustable compression of such filter cartridges, all being features of the present invention.

U.S. Pat. No. 136,364, issued to Walter M. Conger on Mar. 4, 1873, illustrates a filter having filter elements disposed in series and also flushing circuitry. However, the device of Conger lacks the threaded, separable, two part housing of the present invention, reverse osmosis filtration, UV irradiation, flushing circuitry contained within a part of the housing, adjustable compression of filter cartridge elements, and the inlet and outlet arrangement, and internal flow scheme of the present invention.

None of the above inventions and patents, taken either singly or in combination, is seen to describe the instant invention as claimed.

SUMMARY OF THE INVENTION

The present invention provides a readily installed and serviced filter apparatus which employs readily available filter cartridges and which further enables ready flushing. The novel filter apparatus includes a two part housing which can be opened to expose the plural filter cartridges without interrupting liquid connections. The filter has one threaded liquid inlet and three threaded outlets, one outlet for filtered water and two for the discharge of waste when flushing.

The filter apparatus accepts a plurality of carbon and reverse osmosis filter cartridges. Internal liquid flow circuitry passes water in a serial routing through the several cartridges. This ability may be exploited to subject all water to filters designed to trap different contaminants. An ultra-violet source at the core of the filter housing provides irradiation for additional purification of the filtered water. The filter can be flushed automatically or with minimal difficulty, in particular requiring neither removal of the filter cartridges nor disassembly from the domestic plumbing system. The filter is configured to assure that water employed for flushing will not be discharged in common with filtered water.

Accordingly, it is a principal object of the invention to provide a water filter readily connectable to a domestic plumbing system.

It is another object of the invention to provide a water filter which accepts plural filter elements.

It is a further object of the invention that the filter employ commercially available filter cartridges.

Still another object of the invention is to enable flushing without requiring removal of filter elements.

An additional object of the invention is to prevent water employed to flush the filter from being discharged in common with filtered water.

It is again an object of the invention to provide a filter housing which opens to expose filter elements without requiring disassembly from the domestic plumbing system.

Yet another object of the invention is to enable compression of the housing to secure filter cartridges.

Still another object of the invention is to provide serial and parallel flow through multiple filter cartridges.

Another object of the invention is to provide filtration by reverse osmosis through at least one filter cartridge.

An additional object of the invention is to provide UV irradiation of the water being filtered.

Another object of the invention is to provide improved elements and arrangement thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
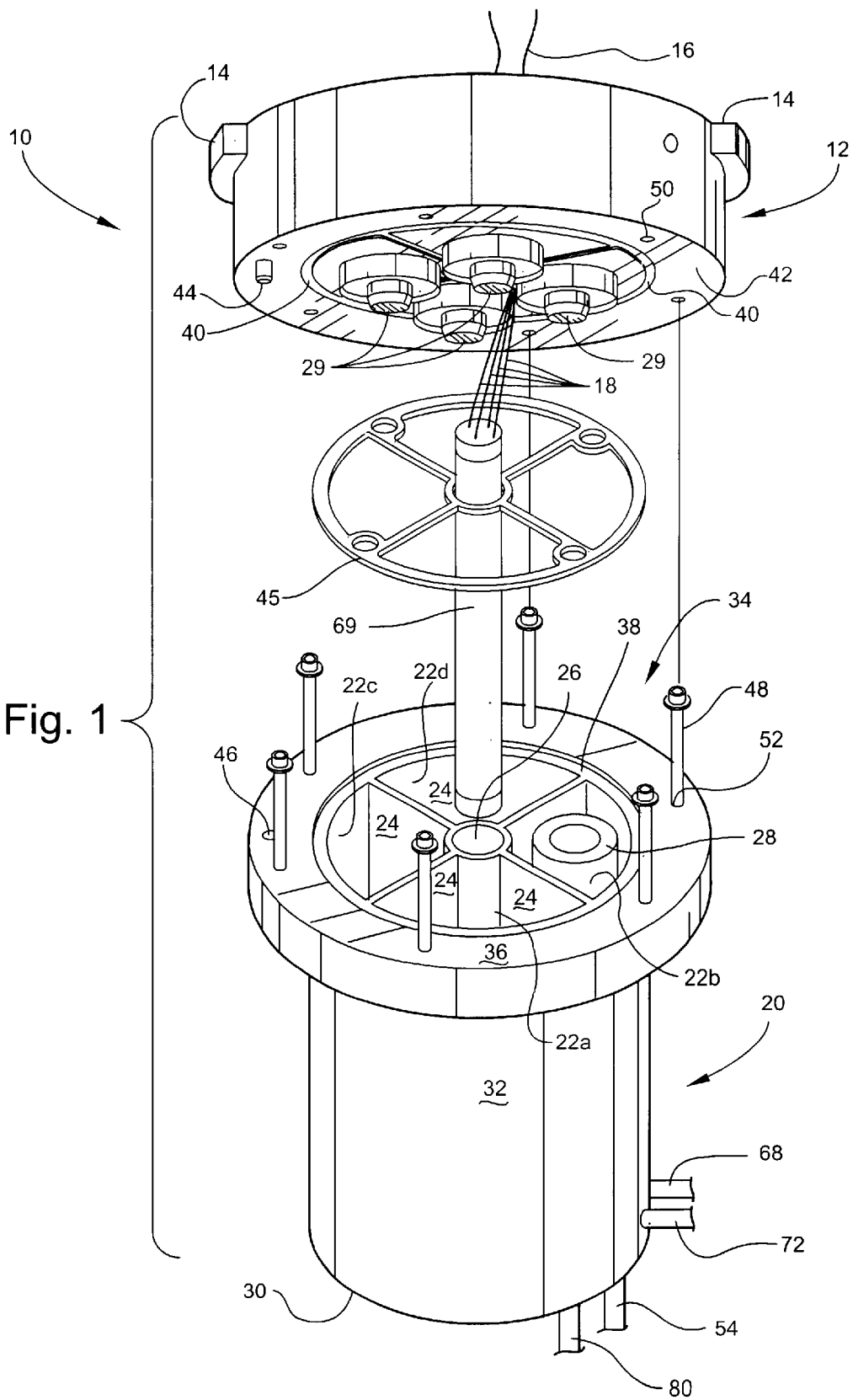
FIG. 1 is an exploded, perspective view of the invention.
Figure 2:
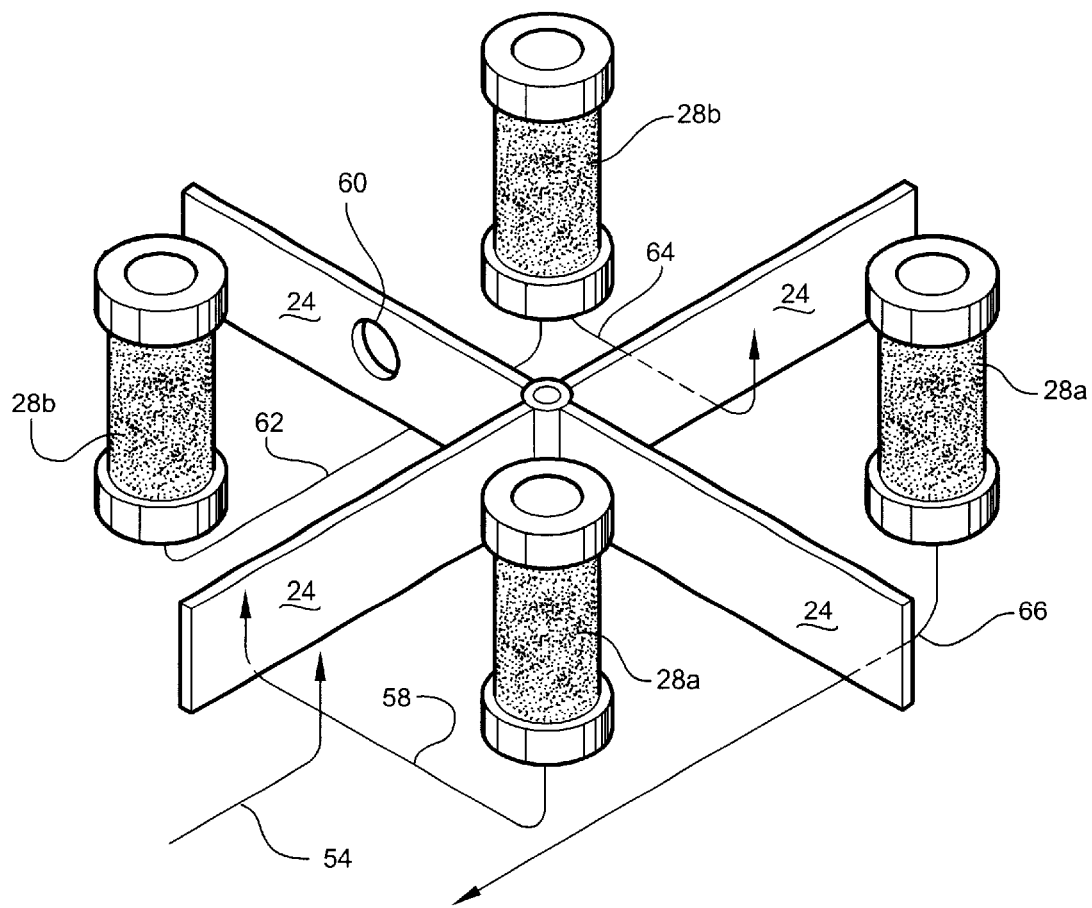
FIG. 2 is an exaggerated, diagrammatic representation of fluid circuitry of liquid being filtered.
Figure 3:
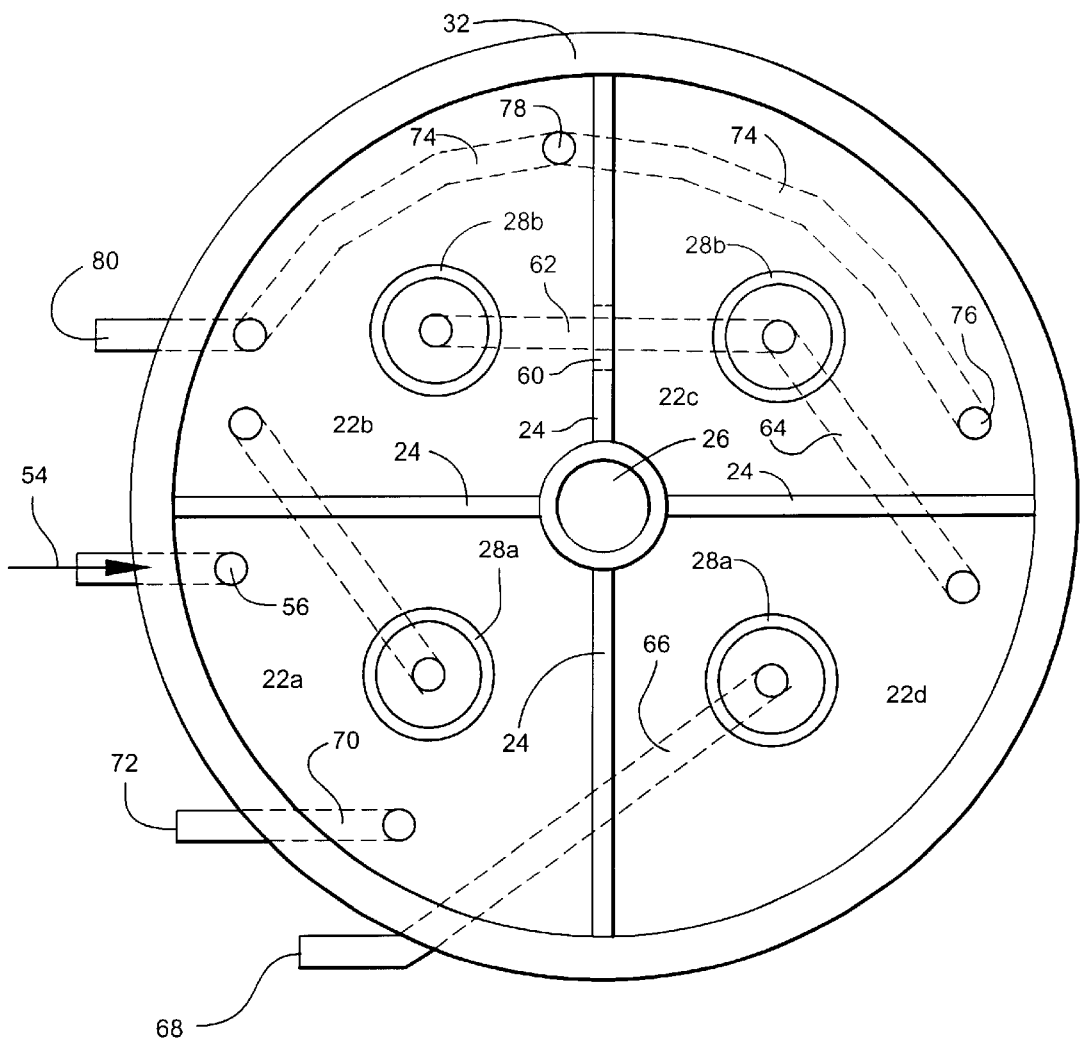
FIG. 3 is a modified plan view of the canister of the invention showing filtration and flushing passages.

Referring now to FIGS. 1–3 of the drawings, novel multi-element filter housing 10 is seen to comprise a cap 12 with handles 14. Electrical feeds 16 supply power to a electrical connector 18 located at the center of the lower surface 42 of cap 12. A canister 20 is divided into four separate chambers, hereinafter collectively referred to as chambers 22, and individually referred to as chambers 22A, B, C, and D, separated by four internal walls 24. At the juncture of walls 24 is a central tube 26. Walls 24 and central tube 26 are constructed of a ultra-violet (UV) transmissive material. Each chamber 22 contains one filter, hereinafter collectively referred to as filter cartridges 28, with chambers 22A and 22D containing a carbon (charcoal) filter cartridge 28A and chambers 22B and 22C containing reverse osmosis filters 28B. Filter cartridges 28 are annular, open at the top and at the bottom, and are conventional, commercially available products. Each of the two filter cartridges 28A may differ in their filtration characteristics despite similar dimensions and configuration. Cannister 20 has a solid or continuous bottom 30 and peripheral wall 32, and an open top 34 within an upper surface 36. Bottom 30 and wall 32 are continuous so as to retain liquid within canister 20. Recess 38 in upper surface 36 of canister 20 and circumferential groove 40 in the lower surface 42 of cap 12 are provided to receive gasket 45. A tab (not shown) on the lower perimeter of gasket 45 fits into a slot (not shown) in recess 38 to ensure proper gasket alignment. Filter cartridges 28 are secured in place by a plurality of filter cartridge retainers 29 located in the lower surface 42 of cap 12 and bottom 30 of canister 20.

Figure 4:
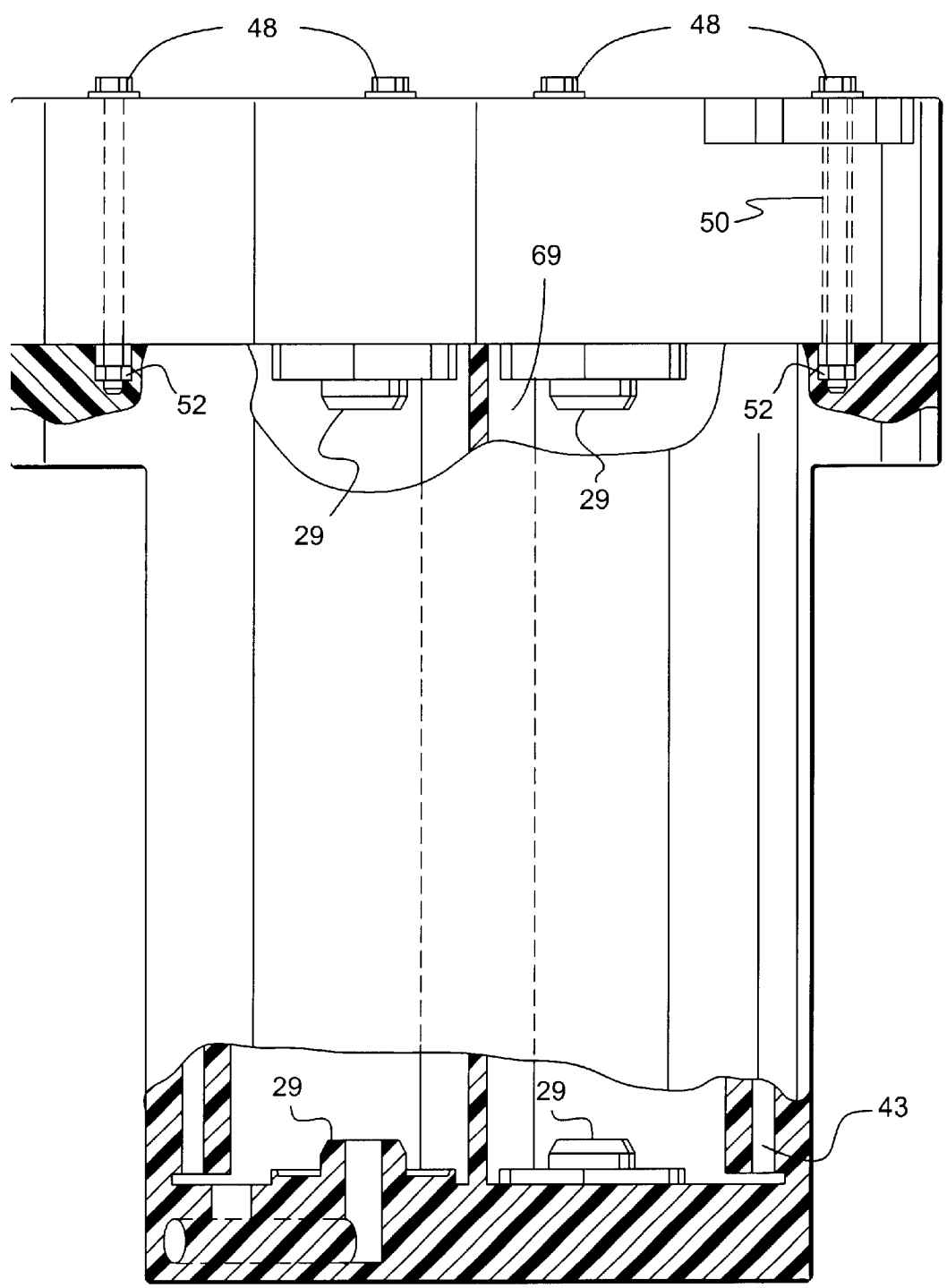
FIG. 4 is a partial cross sectional view of the invention.

Position of canister 20 relative to cap 12 is critical to alignment of filter cartridges 28 and filter cartridge retainers 29. Consequently, alignment pin 44 in lower surface 42 of cap 12 fits into alignment aperture 46 in upper surface 36 of canister 20. Cap 12 and canister 20 are joined by bolts 48, fitting through cap apertures 50 and threaded into nuts 52 molded into upper surface 36 of canister 20 (FIG. 4).

Liquid flow through filter housing 10 is shown in simplified, diagrammatic manner in FIG. 2 and in plan view in FIG. 3. It will be recalled from FIG. 1 that chambers 22 are separated from one another by walls 24. Unfiltered water obtained from the domestic water supply passes through inflow port 56 and enters chamber 22A from bottom 30, as indicated by arrow 54. Inflow port 56 is disposed to discharge this water outside the open center of filter cartridge 28A occupying the chamber 22A. As chamber 22A fills, pressure will urge water through the filtering element of cartridge 28A into the open center of cartridge 28A. Filtered water descends to a passage 58 formed in the bottom 30 of canister 20. This passage conducts water to chamber 22B where it again enters the chamber outside of the open center of filter cartridge 28B. Water also flows from chamber 22B to chamber 22C through an aperture 60 in the common wall 24 between chambers 22B and 22C. As chambers 22B and 22C fill, water passes through the filtering element of the respective filter cartridges 28B into the open centers. Water from chamber 22B and 22C flows through passages 62 and 64 to chamber 22D, where the process of filtration and passage of water to the open center of filter cartridge 28A is again repeated. Filtered water then passes through passage 66 to outflow port 68 through the passage in the bottom of filter cartridge 28. Outflow port 68 is connected to a pipe or conduit 4 (FIG. 5) connected to taps or water using appliances (not shown). In summary, filter housing 10 conducts liquid through both parallel and serial conduits through the various filter elements or cartridges 28 contained within filter housing 10. Water is thereby subjected to the cumulative effect of three of the four filters.

Ultra-violet (UV) source 69, a commercially available UV emitting light tube, connected to electrical connector 18 is fitted into central tube 26. UV radiation emitted by UV source 69 and passing through the UV transmissive wall of central tube 26 provides additional, bacterial, purification of water passing through filter housing 10. Gasket 45 seals the top of central tube 26 against lower surface 42 of cap 12 preventing the flow of liquids into central tube 26.

Thus far, the filtering circuit has been described. At this point the flushing circuit will be described, as illustrated in FIG. 3. Filter housing 10 has two, independent flushing zones for removing contaminants from the system, a first zone for chamber 22A and a second zone for chambers 22B and C. A flush channel 70 is formed proximate bottom 30 in each of chamber 22A, B, and C, passing through bottom 30. Flush channel 70 of chamber 22A communicates directly with first flush output port 72. Flush channel 74, having apertures 76 and 78 in chambers 22B and C, respectively, communicates, with second flush output port 80. Check valves 82 and 84 (not shown) and back flow air gaps 86 and 88 (not shown) prevent contaminants from backing up through the filter into water supply lines. Flush output ports 72 and 80 are connected to a pipe or conduit 6 arranged to discharge flushing water to a suitable drain, (not shown) or other facility for disposal. Flush output ports 72 and 74 are controlled by solenoid valves 7 and 7a which are in turn, controlled by a suitable control device 8. Control device 8 may be a time clock, a manual switch, or any other device enabling manual or automatic operation of solenoid valves 7 and 7a.

During the filtration process, water enters chamber 22A from inflow port 56. Periodic flushing of contaminates is accomplished independently in each of the two zones by opening one or both of the flush output ports 72 or 80 by way of solenoid valves 7 or 7a. The opening of flush output port 72 allows water to flow through chamber 22a and carry contaminants through flush channel 70 to flush output port 72. The opening of flush output port 80 allows water to flow through the chambers 22B and C and drain from chambers 22B and C through flush channel 74 and flush output port 80. Water and contaminants are discharged through flush output ports 72 and 80 without coming into contact with and subsequently fouling filtered water.

Figure 5:
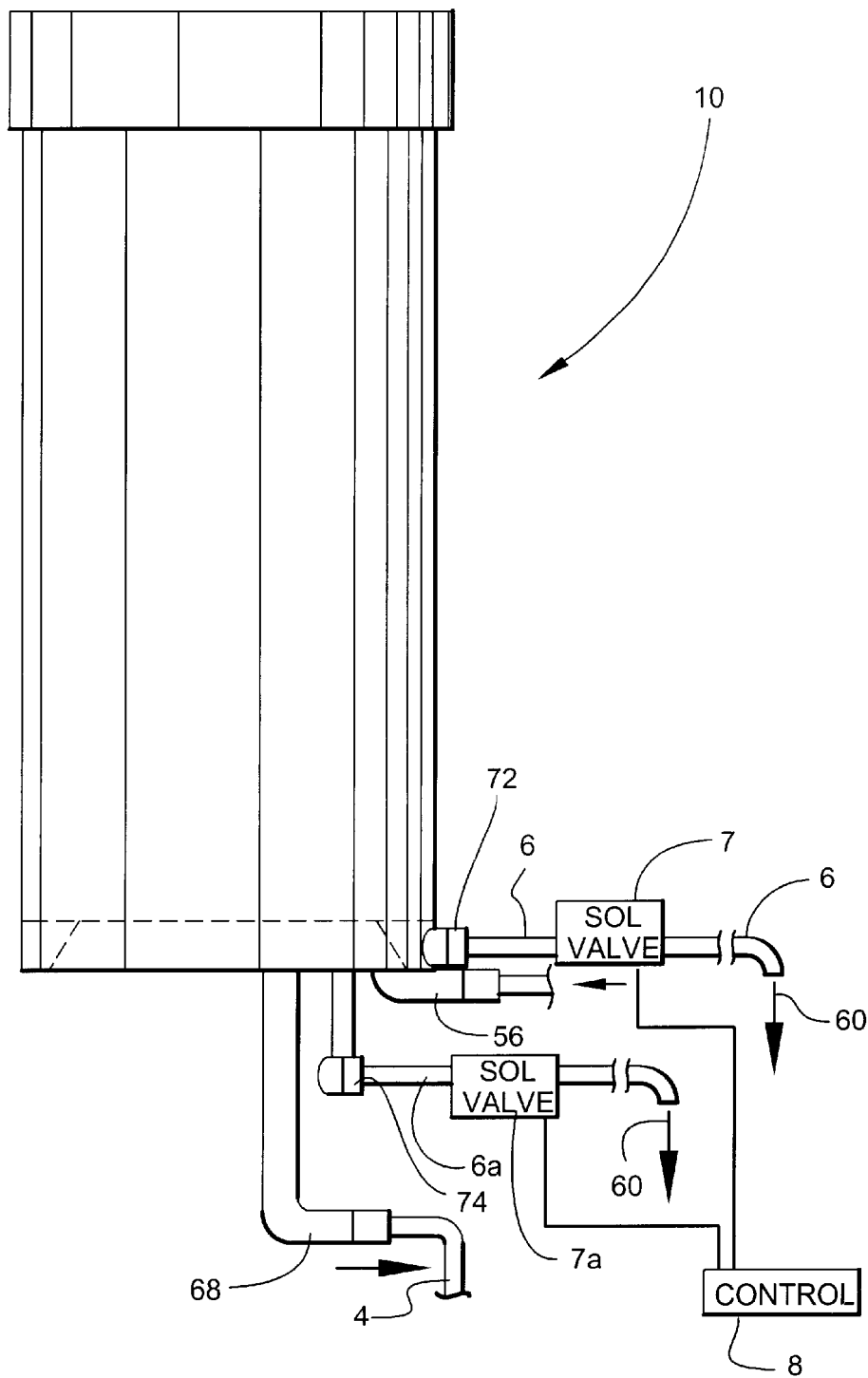
FIG. 5 is a side view of the invention.

FIG. 5 depicts filter housing 10 as it would be installed in a domestic plumbing system. Direction of flow of water is indicated by arrows. It should be noted that for simplification of the figures, the positioning of external connections in all drawings are illustrative and do not indicate exact alignments.

The present invention is susceptible to variations and modifications which may be introduced without departing from the inventive concept. Several examples of modifications will be set forth. Filter housing 10 may be provided with any number of chambers 22 and appropriate fluid circuitry to accommodate any number of filter cartridges 28. Bolts 48 and nuts 52 joining cap 12 and canister 20 could be replaced by latching arms (not shown) or other fastening elements which could serve in their place.

It is to be understood that the present invention is not limited to the embodiments described above, but encompasses any and all embodiments within the scope of the following claims.

What is claimed is:

1. A multi-element filter system, comprising:
   a canister comprising:
      a solid bottom,
      a peripheral wall disposed substantially perpendicular to said bottom, said bottom and said wall defining an enclosed space adapted to contain a liquid,
      a plurality of internal walls dividing said canister into a plurality of separated chambers,
      a central, vertical tube disposed at the juncture of said internal dividing walls, said central tube being isolated from each of said separated chambers,
      a cap, removably affixed to said peripheral wall,
      a gasket disposed between said cap and said peripheral wall and said central, vertical tube to form a liquid seal therebetween;
   a plurality of filter elements, one of said plurality of filter elements being disposed in each of said separated chambers;
   a filtration circuit comprising a liquid passage through said plurality of chambers and said plurality of filter elements,
   inlet and discharge means in fluid communication with said filtration circuit for conducting a liquid to and receiving a liquid from said filter system;
   threaded fastening for connecting said canister and said cap, compressing said gasket between said canister and said cap, creating a watertight connection.

2. A multi-element filter system, as defined in claim 1, further comprising:
   at least one flushing circuit for flushing contaminants from said chambers and said filter elements.

3. A multi-element filter system, as defined in claim 2, wherein said flushing circuit further comprises:
   a said liquid inflow port, and
   a first flush channel disposed within said bottom of said canister, communicating between said first chamber and a first flush port exterior of said canister at a point proximate said liquid inflow port.

4. A multi-element filter system, as defined in claim 2, wherein said flushing circuit further comprises:
   a liquid inflow port, and
   a flush channel disposed within said bottom of said canister, communicating with each of said chambers intermediate between said first chamber and said last chamber, each of said intermediate chambers containing one of said reverse osmosis filter elements, and a second flush port exterior of said canister at a point proximate said liquid inflow port.

5. A multi-element filter system, as defined in claim 1, wherein at least one of said plurality of filter elements comprises a reverse osmosis filtering element.

6. A multi-element filter system, as defined in claim 1, further comprising a keying element disposed to constrain said canister and said cap against mutual rotation.

7. A multi-element filter system, as defined in claim 1, further comprising a lower filter element retainer situated at the bottom of each of said chambers and substantially centered within each of said chambers and an upper filter element retainer situated on the lower surface of said cap corresponding to and vertically aligned with a corresponding one of said lower filter element retainers, said lower and upper filter element retainers fitting within the open ends of said filter elements to hold them firmly in place.

8. A multi-element filter system, as defined in claim 1, wherein the walls of said central, vertical tube are of an ultra-violet (UV) transmissive material and houses a UV source operatively connected to said lower surface of said cap.

9. A multi-element filter system, as defined in claim 8, wherein said UV source further comprises a commercially available UV light tube.

10. A multi-element filter system, as defined in claim 1, wherein said filtration circuit further comprises:
    a liquid inflow port disposed within said bottom of said canister passing from the exterior of said canister into a first of said chambers,
    a plurality of flow passages disposed within said bottom of said canister, each of said flow passages communicating between two of said chambers, and
    a liquid outflow port disposed within said bottom of said canister, passing from within a last of said chambers to the said exterior of said canister proximate said liquid inflow port.

11. A multi-element filter system, comprising:
    a canister comprising:
       a solid bottom,
       a peripheral wall disposed substantially perpendicular to said bottom, said bottom and said wall defining an enclosed space adapted to contain a liquid,
       a plurality of internal walls dividing said canister into a plurality of separated chambers, each of said chambers further comprising a lower filter element retainer situated at the bottom of each of said chambers and substantially centered within each of said chambers,
       a central vertical tube disposed at the juncture of said internal walls, said central tube being
          fluidly isolated from each of said separate chambers, and
          constructed of an ultra-violet (UV) transmissive material,
       a cap removably affixed to said peripheral wall, said cap further comprising:
          a keying element disposed to constrain said canister and said cap against mutual rotation, and
          an upper filter element retainer situated on the lower surface of said cap, corresponding to and vertically aligned with a corresponding one of said lower filter element retainers, said lower and upper filter element retainers fitting with the open ends of said filter elements to hold them firmly in place, and
          an ultra-violet (UV) light tube operatively connected to said lower surface of said cap, said UV light tube fitting within said central, vertical tube when said canister and said cap are affixed one to the other,
       a gasket disposed between said cap and said peripheral wall and said central, vertical tube to form a liquid seal therebetween,
    a plurality of filter elements, one of said plurality of filter elements being disposed in each of said separated chambers, at least one of said plurality of filter elements filtering being a reverse osmosis filtering element;
    a filtration circuit comprising a liquid passage through said plurality of chambers and said plurality of filter elements, comprising:
       a liquid inflow port disposed within said bottom of said canister communicating with a liquid supply line exterior of said cannister and the first of said chambers, a plurality of flow passages disposed within said bottom of said canister, each of said flow passages communicating between two of said chambers, and a liquid outflow port disposed within said bottom of said canister, communicating with the last of said chambers and a liquid discharge line exterior to said canister, at least one flushing circuit for flushing contaminants from said chambers and said filter elements, said flushing circuit comprising:

a liquid inflow port, and a first flush channel disposed within said bottom of said canister, communication between said first chamber and a first flush port exterior of said canister at a point proximate said liquid inflow port.

12. A multi-element filter system, as defined in claim 11, wherein said flushing circuit further comprises:

a canister comprising:

a solid bottom, a peripheral wall disposed substantially perpendicular to said bottom, said bottom and said wall defining an enclosed space adapted to contain a liquid, a plurality of internal walls dividing said canister into a plurality of separated chambers, each of said chambers further comprising a lower filter element retainer situated at the bottom of each of said chambers and substantially centered within each of said chambers, a central vertical tube disposed at the juncture of said internal walls, said central tube being fluidly isolated from each of said separate chambers, and constructed of an ultra-violet (UV) transmissive material, a cap removably affixed to said peripheral wall, said cap further comprising:

a keying element disposed to constrain said canister and said cap against mutual rotation, and an upper filter element retainer situated on the lower surface of said cap, corresponding to and vertically aligned with a corresponding one of said lower filter element retainers, said lower and upper filter element retainers fitting with the open ends of said filter elements to hold them firmly in place, and an ultra-violet (UV) light tube operatively connected to said lower surface of said cap, said UV light tube fitting within said central, vertical tube when said canister and said cap are affixed one to the other, a gasket disposed between said cap and said peripheral wall and said central, vertical tube to form a liquid seal therebetween, a plurality of filter elements, one of said plurality of filter elements being disposed in each of said separated chambers, at least one of said plurality of filter elements filtering being a reverse osmosis filtering element;

a filtration circuit comprising a liquid passage through said plurality of chambers and said plurality of filter elements, comprising:

a liquid inflow port disposed within said bottom of said canister communicating with a liquid supply line exterior of said cannister and the first of said chambers, a plurality of flow passages disposed within said bottom of said canister, each of said flow passages communicating between two of said chambers, and a liquid outflow port disposed within said bottom of said canister, communicating with the last of said chambers and a liquid discharge line exterior to said canister, at least one flushing circuit for flushing contaminants from said chambers and said filter elements, a liquid inflow port, a flush channel disposed within said bottom of said canister, communicating with each of said chambers intermediate between said first chamber and said last chamber, each of said intermediate chambers containing one of said reverse osmosis filter elements, and a second flush port exterior of said canister at a point proximate said liquid inflow port.

\* \* \* \* \*